(12) United States Patent
Smith et al.

(10) Patent No.: US 11,674,198 B2
(45) Date of Patent: Jun. 13, 2023

(54) FILTER HANDLING TOOL

(71) Applicant: PYROTEK, INC., Spokane, WA (US)

(72) Inventors: Adam J Smith, Staffordshire (GB);
Paul Bosworth, Staffordshire (GB);
Robert Fritzsch, Trondheim (NO);
Mark Vincent, Staffordshire (GB)

(73) Assignee: PYROTEK, INC., Spokane, WA (US)

( * ) Notice: Subject to any disclaimer, the term of this patent is extended or adjusted under 35 U.S.C. 154(b) by 0 days.

(21) Appl. No.: 16/604,421

(22) PCT Filed: Apr. 10, 2018

(86) PCT No.: PCT/US2018/026924
§ 371 (c)(1),
(2) Date: Oct. 10, 2019

(87) PCT Pub. No.: WO2018/191281
PCT Pub. Date: Oct. 18, 2018

(65) Prior Publication Data
US 2020/0157654 A1 May 21, 2020

Related U.S. Application Data

(60) Provisional application No. 62/483,631, filed on Apr. 10, 2017.

(51) Int. Cl.
*C22B 9/02* (2006.01)

(52) U.S. Cl.
CPC .................................. *C22B 9/023* (2013.01)

(58) Field of Classification Search
CPC ............................. C22B 9/023; C22B 21/066
See application file for complete search history.

(56) References Cited

U.S. PATENT DOCUMENTS

| | | |
|---|---|---|
| 3,090,094 A | 5/1963 | Schwatzwalder et al. |
| 3,097,930 A | 7/1963 | Holland |
| 3,747,765 A | 7/1973 | Nowak |
| 3,893,917 A | 7/1975 | Pryor et al. |
| 4,081,371 A | 3/1978 | Yarwood et al. |
| 4,426,287 A | 1/1984 | Narumiya |
| 4,444,377 A | 4/1984 | Groteke et al. |
| 4,504,392 A | 3/1985 | Groteke |

(Continued)

OTHER PUBLICATIONS

Extended European Search Report for EP Application No. 18785005.2, dated Nov. 17, 2020, 6 pages.

(Continued)

*Primary Examiner* — Scott R Kastler
(74) *Attorney, Agent, or Firm* — Lippes Mathias LLP

(57) ABSTRACT

A molten metal filter box. The filter box includes a filter housing provided in a flow path for molten metal. A horizontal partition is disposed within the filter housing and has at least one filter receiving passage. A filter medium in the shape of a substantially flat plate is positioned within the filter receiving passage and below an inflow path of the molten metal. The filter medium includes a hole. A filter handling tool is disposed within the hole. The filter handling tool can optionally include a handle secured to the molten metal filter box to suspend the filter medium. Advantageously, the filter medium can be removed by grasping the filter handling tool and removing the filter medium.

15 Claims, 3 Drawing Sheets

(56) References Cited

U.S. PATENT DOCUMENTS

| | | | |
|---|---|---|---|
| 4,640,497 A | 2/1987 | Heamon | |
| 8,112,864 B2* | 2/2012 | Vincent | C22B 9/023 29/426.1 |
| 2001/0020759 A1 | 9/2001 | Hatano et al. | |
| 2005/0199560 A1 | 9/2005 | Jagt | |
| 2020/0157654 A1* | 5/2020 | Smith | B22C 9/086 |

OTHER PUBLICATIONS

Fritzsch, Robert et al. "Effect of electromagnetic fields on the priming of high grade ceramic from filters (CFF) with liquid aluminum", Light Metals, 2015., pp. 929-935.

\* cited by examiner

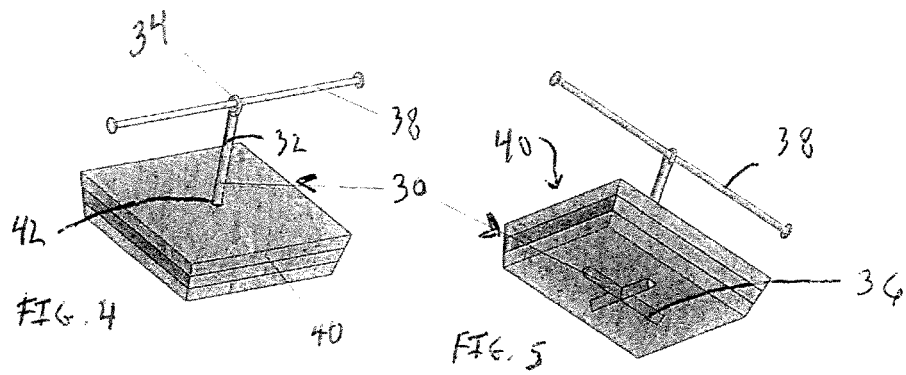
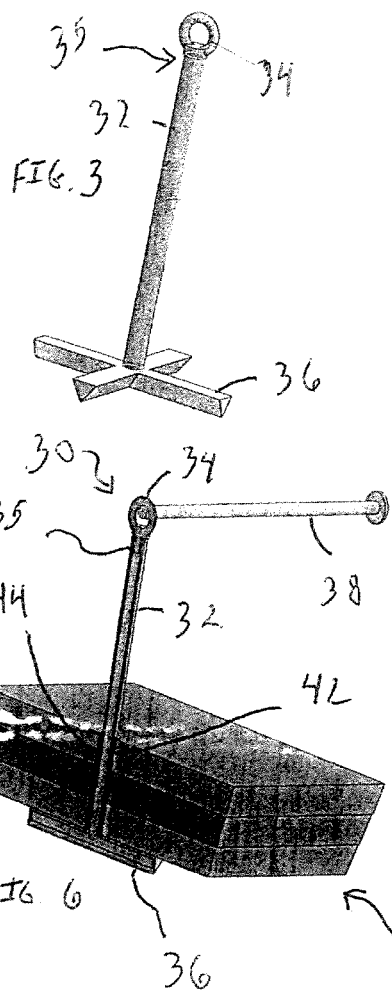
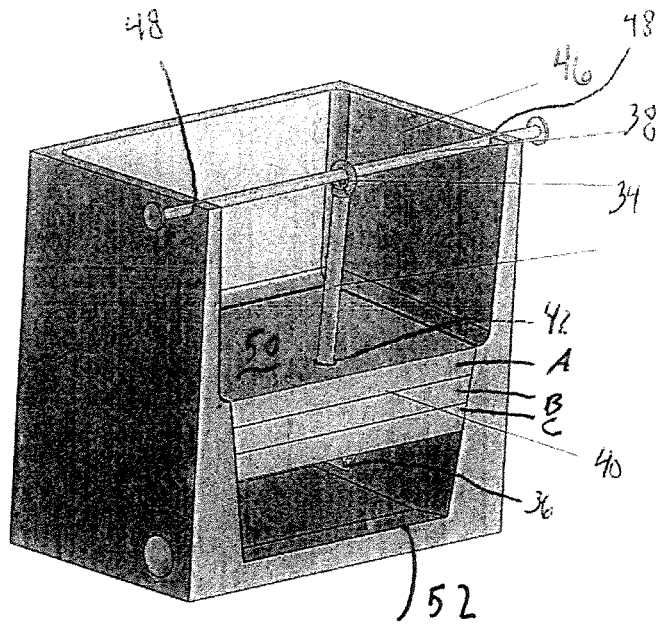

FILTER HANDLING TOOL

BACKGROUND

The present exemplary embodiment relates apparatus for filtering molten metal. It finds particular application in conjunction with a tool for installation, removal and positioning of a filtering medium, and will be described with particular reference thereto. However, it is to be appreciated that the present exemplary embodiment is also amenable to other similar applications.

Molten metal, particularly molten aluminum, often contains entrained solids which are deleterious to a final cast metal product. These entrained solids appear as inclusions in the final cast product after the molten metal is solidified and cause the final product to be less ductile or to have poor bright finishing and anodizing characteristics. The inclusions may originate from several sources. For example, the inclusions may originate from surface oxide films. In addition, the inclusions may originate as insoluble impurities, such as carbides, borides and others derived from eroded furnace and trough refractories.

Rigorous melt treatment processes, such as fluxing, minimize the occurrence of such defects; however, these are not always successful in reducing them to a satisfactory level for critical applications. Conventionally, melt filtration is utilized in order to further decrease the extent of such defects. One type of filter in common use is porous ceramic foam. Exemplary porous ceramic foam filters are known in the art, for example, representative examples are described in U.S. Pat. Nos. 3,090,094 and 3,097,930. These porous ceramic foam materials are known to be particularly useful in filtering molten metal, as described in U.S. Pat. No. 3,893,917 for "Molten Metal Filter" by Michael J. Pryor and Thomas J. Gray, patented Jul. 8, 1975, and also as described in copending U.S. patent application Ser. No. 563,213 for "Ceramic Foam Filter" by John C. Yarwood, James E. Dore and Robert K. Preuss, filed Mar. 28, 1975.

Porous ceramic foam materials are particularly useful for filtering molten metal for a variety of reasons included among which are their excellent filtration efficiency, low cost, ease of use and ability to use same on a disposable, throwaway basis. The fact that these ceramic foam filters are convenient and inexpensive to prepare and may be used on a throwaway basis requires the development of means for easily and conveniently assembling and removing the filters from a filtration unit.

In the conventional filtering devices, molten metal flows downwardly to the filter medium. When the inflow of the molten metal from smelting furnaces to the filtering device is stopped during switching from one smelting furnace to another or after the end of the filtering operation, the molten metal left in the filtering device flows away from the device through the filter medium. After the molten metal is finished passing through the filter medium, the filter must be replaced. Similarly, the filter medium may become clogged because the oxide film, such as aluminum oxide film, which is formed on the surface of the molten metal contacted with the ambient air in the filtering device, flows into the filter medium with the remaining molten metal and sticks on the medium. Traditionally, when a filter must be replaced, a hole is punched into the filter while the metal is still in liquid form and it is then allowed to cool in the filtration box to below 250° C. at which point it is grasped with a hook. This process requires time for cooling down and heating up, wears down the refractory material of the filtration box, and contaminates the filtration box with pieces of broken filter medium as a result of the punching step.

This disclosure relates to a device for use in association with filtering of a molten metal such as molten aluminum, and more particularly to a molten metal filter handling device so constructed that the filter medium can be changed with reduced difficulty.

Thus, the development of a device which permits easy and safe changing of the filter medium has long been in demand. Moreover, in order to fully utilize the advantageous properties of the filter medium made of porous ceramic material, i.e. large capacity for filtration and effective treatment of successive lots of molten metal, there is a need for the development of a device capable of improving the process of changing such filter media.

BRIEF DESCRIPTION

According to a first embodiment a tool for installing and removing a filter from a molten metal filtration box is provided. The tool includes a shank, a head end permanently secured to a first end of the shank, and a handle releasably secured to a second end of the shank.

According to a second embodiment, a method for mounting and removing a filter from a filtration box is provided. The method comprises the steps of (a) providing a tool that has a shank, a head end permanently secured to a first end of the shank, and a handle releasably secured to a second end of the shank; (b) removing the handle from the tool; (c) inserting the tool shank through a hole formed in the filter; (d) attaching the handle to the tool shank; (e) positioning the filter in a desired location within the filter box using said tool; and (f) suspending the filter inclusive tool from a portion of the filter box.

According to a further embodiment, a molten metal filter box is provided. The filter box includes a filter housing provided in a flow path for molten metal. A horizontal partition is disposed within the filter housing and has at least one filter receiving passage. A filter medium is positioned within the filter receiving passage and below an inflow path of the molten metal. The filter medium includes a hole. A filter handling tool is disposed within the hole. The filter handling tool includes a removable handle end secured to the molten metal filter box to suspend the filter medium. Advantageously, the filter medium can be removed by grasping the filter handling tool and removing the filter medium without completely emptying molten metal from the filter housing. In certain embodiments, the filter box will include an induction coil.

BRIEF DESCRIPTION OF THE DRAWINGS

FIG. 3 is a perspective view of the present filter handling tool;

FIG. 4 is a top side perspective view of the filter handling tool associated with a filter plate;

FIG. 5 is a bottom side perspective view of the filter handling tool associated with a filter plate;

FIG. 6 is a cross-section view of the filter handling tool associated with a filter plate;

FIG. 7 is a cross-section view of the filter handing tool and filter plate inserted into a filter box.

DETAILED DESCRIPTION

Figure 1:
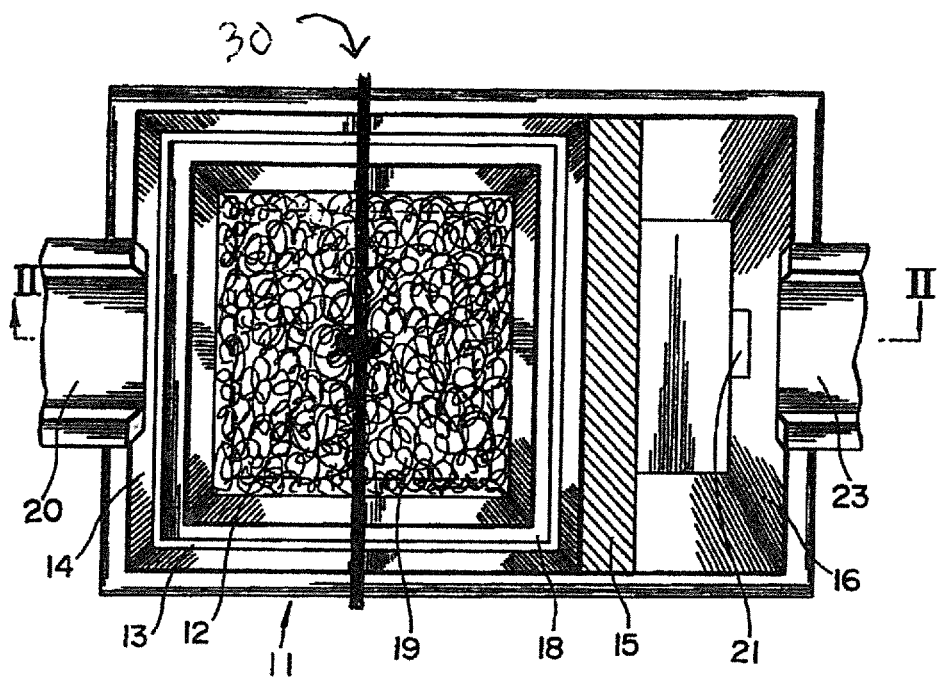
FIG. 1 is a sectioned top view of an exemplary molten metal filter box.
Figure 2:
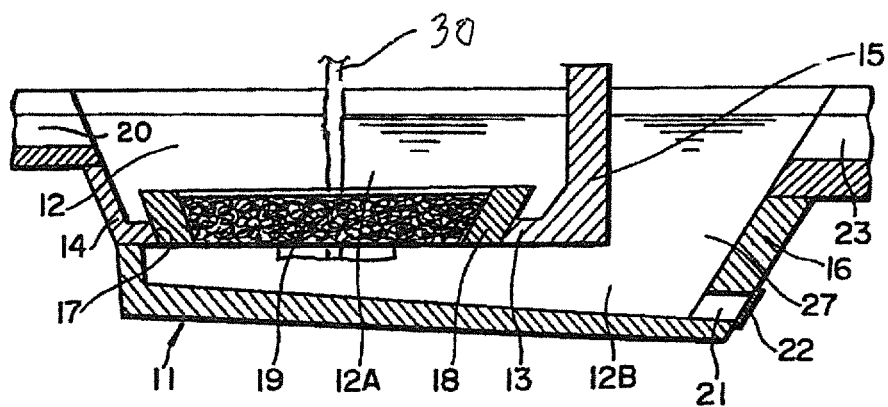
FIG. 2 is a sectioned side view taken along the line II-II in the diagram of FIG. 1.

Referring now to FIGS. 1 and 2, a molten metal filtering device 11 made of refractory material and providing a flow path for molten metal, with the inner surfaces thereof defining the lateral sides of an inversed, truncated quadrangular pyramid is depicted. A filter housing 12 is formed within filtering device 11. Inside the filter housing 12, a horizontal partition 13 is extended from lateral wall 14. In one edge portion of the horizontal partition 13, a vertical partition wall 15 is integrally raised upwardly as separated from the opposite lateral wall 16. The horizontal partition 13 and the vertical partition wall 15 divide the filter housing 12 into two halves.

Horizontal partition 13 has a generally quadrangular filter-setting hole 17 whose inner walls are converged downwardly. In filter-setting hole 17, an optional filter frame 18 is formed of a refractory material such as refractory bricks in a pattern enclosing an empty space of the shape of an inverted, truncated quadrangular pyramid. Frame 18 can be detachably yet liquid-tightly fitted so that the upper part of the frame 18 will protrude from the horizontal partition 13. A filter medium 19 made of porous ceramic material in the shape of a flat plate whose lateral walls define the sides of an inverted, truncated quadrangular pyramid liquid-tightly set in position in the opening of filter frame 18. The filter medium 19 can be a porous ceramic material such as a ceramic foam which can be prepared by coating a flexible polyurethane foam having a substantially skeletal reticulated structure with a ceramic slurry and subsequently drying and sintering the coated foam, thereby removing the polyurethane foam through carbonization to leave ceramic strands.

Flow path 20 is provided for the delivery of molten metal at a position higher than the upper surface of the filter medium 19 in enclosure 12A of the two enclosures produced by the interposition of the horizontal partition 13 and the vertical partition wall 15.

The bottom wall of the enclosure 12B is slanted downwardly from the lateral wall to the other lateral wall. A molten metal outlet 21 is formed at the substantially lowest position of the bottom wall which is normally kept closed with a lid 22 and opened when necessary. Above enclosure 12B, a molten metal overflow path 23 is formed in the shape of a groove at a level higher than the filter medium 19.

The molten metal, such as molten aluminum from a smelting furnace (not shown) flows through the molten metal inflow path 20 into the filter housing 12 and into the enclosure 12A, passes downwardly through the filter medium 19, and enters the enclosure 12B. In this case, solid impurities entrained by the molten metal are retained on the filter medium 19. The molten metal which has been freed from the solid impurities and passed into enclosure 12B ascends the flow path 27 formed between the other lateral wall 16 and the vertical partition wall 15 and overflows into the overflow path 23.

A filter handling tool 30 is provided to allow insertion and removal of the filter medium 19. Accordingly, the change of the old filter medium to a new one is easily carried out by utilizing the filter handling tool. Thus, the filtering device can be expected to provide safe and easy exchange of the filter medium as compared with the conventional filtering devices which can involve the dangerous, time-consuming work of thoroughly removing the hot molten metal from the filter box, subsequently breaking the exhausted filter medium and removing the fragments of the broken filter medium. This process with a conventional device entails the possibility that such fragments of the broken filter medium will remain in the filter housing and mingle into the molten metal to be treated in the subsequent cycle of filtration. While the tool is described primarily in association with the removal of ceramic foam filters, the tool can easily be used in other filter applications.

Referring now to FIGS. 3-7, the filter handling tool 30 is described in greater detail. The tool 30 includes a shank portion 32 having a lifting eye 34 at a first end. A head portion 36 is disposed at a second end of the shank portion 32. A handle 38 is removably received through the lifting eye 34.

The lifting eye 34 can also be detachable from the shank portion 32. For example, the lifting eye can be threadedly secured to the shank at 35. As illustrated, a threaded male lifting eye and female shank connection can be used. Of course, alternative mechanisms are contemplated including pinned or slot/groove arrangements. Alternatively, the lifting eye can have an outer dimension which is less than the greatest width dimension of the shank. Similarly, although lifting eye 34 is depicted as a closed circle, any shape configured to receive the handle would be acceptable. Furthermore, a closed shape is not required. Rather, a hook shape is also contemplated.

Although depicted herein as an "X" shaped head portion 36, the head portion can be of many various shapes provided the filter plate 40 (note multiple stacked filter plates are shown, A-B-C) is sufficiently engaged. Moreover, the head is not required to be formed of spokes. For example, the head portion could be a contiguous plate. In this regard, the plate or spokes could form any shape that adequately engages the filter plate(s). The head portion can be permanently attached to the shank by a weld, for example.

In many environments, the filter handling tool will be comprised of metal. Desirable metals include steel, such as mild steel. To improve the resistance of the steel filter handling tool, it may be beneficial to provide the surface of the filter lifting tool with a coating of a refractory material. For example, the hanger can be coated with boron nitride to prevent metal adhesion during the filtration process. Another exemplary coating material is RFM, a composite refractory made of fiberglass fabric embedded in either a calcium silicate slurry, a fused silica slurry, or a combination thereof (available from Pyrotek Inc. of Spokane Wash.). It is possible that only those portions of the filter handling tool that enter molten metal will receive the coating.

Generally speaking, the shank 32 can have a cylindrical shape to correspond with a hole 42 formed in filter plate 40. However, it is noted that certain advantages may be achieved by forming the hole and shank of mated shapes that could prohibit rotation of the filter plate about the longitudinal axis of the shank. For example, corresponding cross-sectional rectangle or star shapes could be employed on each of the shank and hole. In many situations, it may be beneficial to have a close tolerance between the shank and the filter hole to prevent molten metal from traveling through any space created therein and not passing through the filter body. One mechanism for addressing this is to provide a gasket material or insert 44 between the shank and the filter plate. Ceramic fiber is a suitable material for forming the insert/gasket. Alternatively, an expandable material such as available from Shureseal may be used to form the gasket.

In certain installations, although unlikely, there is a "theoretical argument" that molten metal could by-pass the ceramic foam filter (CFF) by passing between the shank portion of the tool and the hole in the filter. Accordingly, a gasket may be included to prevent the metal bypassing the filter. In certain embodiments, the gasket can be placed at the top of the filter. For example the top filter plate could have a bigger hole than the lower second and/or third filter plates and this hole could be lined with a ceramic fibre tube. Similarly, in the case of a single plate filter, the hole can have different dimensions. For example, the hole can be larger at a top portion for receiving the gasket material and narrower at a lower portion to provide a closer tolerance with the shank portion of the tool. By placing the gasket seal at the top it reduces the possibility of bottom seal washing" into the melt. The installer can slide the bar through the hole to provide an improved seal. Ceramic fibre tube is desirable because it is inexpensive, molten metal resistant and compressible. The gasket may further prove advantageous because the bar may become worn and damaged over time and the chance of bye-pass increases.

The assembly can be constructed by first removing the lifting eye 34 and handle 38 from the shank 32 and inserting the shank through the filter(s) 40. Lifting eye 34 can be reattached to the shank 32 and handle 38 inserted through lifting eye 34. In this manner, the filter(s) are suspended on the hanger and can be lowered into the filter box 46. The handling tool and associated filter(s) are prevented from dropping because the handle 38 is received in the locating grooves 48 in the filter box 46.

In certain embodiments, the handle might be omitted such that the head portion of the tool rests on a floor of the filtration box during filtering. It is also noted that the filter may be slightly lifted using the tool during the tap out phase. By creating a small gap between the filter and the filtration box while the metal is still molten, freezing of the filter to the box can be prevented.

At the end of the filtration process the handle 38 is removed and a suitable lifting device is used in conjunction with the lifting eye 34 to remove the filter(s) from the filter box 46. Advantageously, the filter including the present handling tool can be removed from an emptied filtration box much sooner than a filter removed using traditional techniques. Moreover, the filter can be removed using the present handling tool when the filter has cooled to a temperature below metal solidification. For example, a filter used for pure aluminum could be removed at about 660° C. or less. Traditional techniques cannot engage the filter until it has cooled to about 250° C. The lifting eye is removed from the hanger tool and the hanger can be removed from the filter(s). If a reduced outer dimension eye configuration is used, the eye removal and reattachment steps can be omitted.

The present invention can provide a safer mechanism by which to insert and remove a filter to/from a hot filter box. The present invention can be adapted to any size or shape filter (for this disclosure a 23" square filter is shown). The present invention can be used on single or multiple filters. The present invention can be used on ceramic foam filters, bonded particle filters, or other types.

When used with an electromagnetic filter box a steel hanger can help to channel and concentrate the electromagnetic fields. Accordingly, in one embodiment, a low frequency induction coil can be placed around and in very close proximity to a ceramic filter media. The presence of a magnetic field may allow priming of thicker filters. The orientation the coil and filter elements can be either vertical or horizontal, provided a path is made available for gas to escape during priming. The electrical conductors of the induction coil can have many different shapes. For example, flat round, tubular, rectangular, or square. Unlike traditional induction furnace coils, the coils of the present invention need not be constructed for low electrical resistance, as they are not being used as part of a device primarily intended for electrically efficient melting. Thus, a higher current density can be advantageously used (e.g. 50 A/mm$^2$ vs. typical values from 1-32 A/mm$^2$) resulting in proportionately smaller diameter conductors that can provide more turns in a given height of coil, with a corresponding increase in the magnetic field strength. Single, double or more layers of coils can also be used advantageously to achieve even higher magnetic field strengths over the height of the filter media. Induction coils with more than 3 layers can also be used, but with diminishing benefits of additional magnetic field strength.

With continuing reference to FIG. 7, in certain embodiments it may be desirable for the shank 32 to have a length greater than a depth of the filtration box from a top surface 50 of the filter(s) 40 to a floor 52 of the filter box 46. In this manner, when inserted into the filter box, the shank 32 of handle 30 slides through hole 42 until head portion 36 engages floor 52. This spaces head portion from the filters 40 to prevent head portion 36 from interrupting filtering surface area. By employing expandable gasket material in the filter hole 42, the filter headling tool 30 can slide into engagement with the filter box floor yet the hole 42 becomes impervious to molten metal flow once the gasket material is heated and expands.

Figure 8:
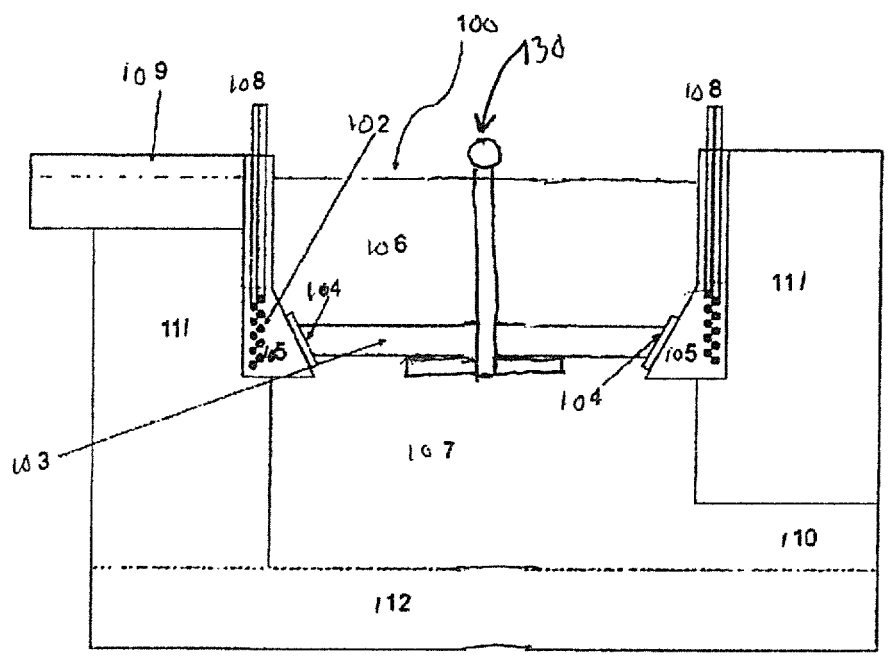
FIG. 8 is a side elevation view of an electromagnetic filter box included the filter handling tool.

FIG. 8 shows a filter assembly 100 including an induction coil 102. A two layer induction coil 2 is shown in FIG. 1. A ceramic foam filter 103 is shown installed within the induction coil 102. The induction coil 102 is preferably placed as close as possible to the edge of filter 103 to achieve the most advantageous results of the magnetic field. Suitable space must be allowed for gasket material 104 to prevent leakage of the liquid metal around the filter 103 and for thermal insulation and refractory material 105. An exemplary gasket material would be a high temperature insulation wool such as alkaline earth silicate wool, alumina silicate wool and/or polycrystalline wool. The high temperature insulation wool can have minimal expansion at elevated temperature. In certain embodiments wherein multiple filter plates are used, it may also be desirable to place a layer of high temperature insulation wool between adjacent filter plates. Sufficient thermal insulation and refractory material must be present to avoid the contact of the hot metal in the upper portion of the bowl 106 or discharge portion of the bowl 107, with coil 102 or with the coil leads 108. In order to function as a filtration device, the bowl must be equipped with a suitable liquid metal feed 109 and discharge means 110. The sides 111 and bottom 112 of the bowl must be designed with adequate refractory to maintain the heat balance of the metal to be filtered. Advantageously, the presence of the steel filter handling tool 130 can improve the performance by channeling the current within the filter 103.

A current can be impressed on the induction coil of sufficient magnitude to generate an average magnetic flux density of 0.05-0.25 T, across the width of the un-primed filter. The frequency of the coil excitation current is preferably between 1 and 60 Hz. The frequency of the coil excitation current is preferably in a range where the ratio between the electromagnetic penetration depth (.delta.) in the liquid metal in the upper portion of the bowl 106 and the average radius or width of the filter 103 is between preferably 0.5 and 3.0, and more preferably between 0.7 and 1.4, in order to achieve both a sufficiently high magnetic penetration and avoid excessive heating.

In one embodiment, liquid metal is added to the upper part of the bowl 106 via inlet 109 with current applied to coil 102. Alternatively, liquid metal is added first, and then current is applied to coil 102. In another embodiment, liquid metal fills the upper portion of bowl 106 to a sufficient height over the last turn of coil 102, such that an electromagnetic meniscus is prevented from forming. This embodiment also avoids excessive oxidation of the metal during priming.

Figure 9:
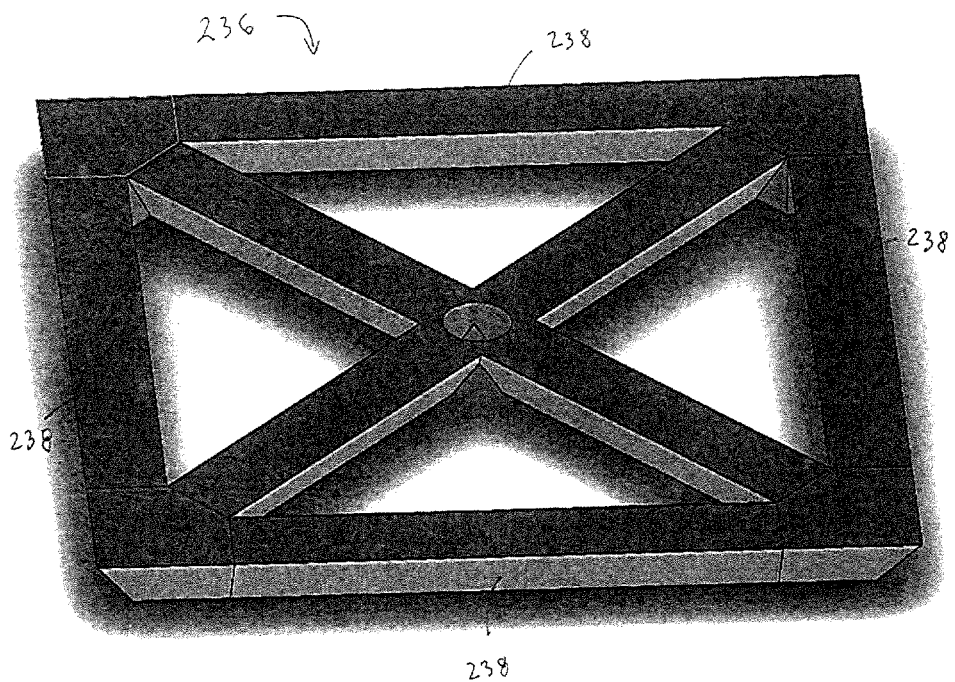
FIG. 9 is a perspective view of an alternative head portion configuration of the filter handling tool.

With reference to FIG. 9, an alternative configuration of the head part of the lifting tool is depicted. Particularly, head portion 236 constitutes a cross provided with perimeter elements 238 to achieve an increased surface area for mating with a filter. This increased surface area is advantageous when the filter is being removed from the filtration box at elevated temperatures. Moreover, at the time of removal, the filter can contain entrained solidified and liquid portions of metal resulting in high weight and brittleness. An increased surface area head portion improves the ability of the tool to remove the filter at elevated temperatures, before solidification of the metal, without breakage. Of course, the shape of the head portion is not limited to rectangular.

The filter removal tool can be constructed of heat and thermal shock resistant material(s), such as steel surrounded by reinforced fiber material (RFM) and optionally coated—perhaps after each use—with a non-stick substance such as boron nitride (ZYP coating, for example).

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for mounting and removing a filter from a filtration box, said method comprising:
    (a) providing a tool that comprise a shank, a head end secured to a first end of the shank, an aperture secured to a second end of the shank, and a removable handle for insertion through the aperture;
    (b) detaching the handle from the shank;
    (c) inserting the shank through a hole formed in a filter medium comprised of porous ceramic material;
    (d) re-attaching the handle to the tool shank; and
    (e) positioning the filter medium in a desired location within a filter box using said tool; and
    (f) wherein after step (e) the shank of the tool slides through the hole in the filter until the head end engages a floor of the filtration box.

2. The method of claim 1 further comprising removing said filter medium from the filtration box at a temperature between about 300° and 660° C.

3. The method of claim 1 further comprising detaching the handle and removing a used filter medium from the tool and inserting the shank through a hole in a new filter medium and reattaching the handle.

4. The method of claim 1 wherein said filter is lifted using the tool during a tap out phase to create a gap between the filter and the filtration box.

5. A molten metal filter box comprising:
    a filter housing provided in a flow path for molten metal, said filter housing including an induction coil providing an electromagnetic current;
    a horizontal partition disposed within said filter housing and having at least one filter receiving passage;
    a filter medium comprised of at least one porous ceramic material plate positioned within said filter receiving passage and below an inflow path of said molten metal, the porous ceramic material of said porous ceramic material plate including a hole;
    a filter handling tool disposed within said hole, said filter handling tool including a handle and a head portion interconnected by a shank, at least one of the handle and the head portion being removable from the shank;
    wherein the filter handling tool improves channeling of the electromagnetic current within the filter; and
    wherein said filter medium can be removed by grasping the filter handling tool by the handle and removing said filter medium.

6. The filter box of claim 5 further comprising a gasket material disposed within said hole.

7. The filter box of claim 6 wherein said gasket material is comprised of a material that expands when heated.

8. The filter box of claim 5 further comprising an at least substantially non-expandable gasket material disposed between the filter medium and the filter housing.

9. The filter box of claim 5 further comprising a grasping portion comprised of a ring or hook configured to receive the handle.

10. The filter box of claim 9 wherein said ring or hook is selectively detachable from the shank.

11. The filter box of claim 5 wherein said shank has a length greater than a distance between a top surface of the filter medium when positioned in said filter receiving passage and a floor of the filter box below the filter medium.

12. The filter box of claim 9 wherein said head portion is permanently attached to said shank and said grasping portion is selectively removable from the shank.

13. The filter box of claim 5 wherein said head portion includes a rectangular perimeter.

14. The method of claim 1 wherein the filter medium comprises multiple stacked flat plates comprised of porous ceramic material.

15. The molten metal filter box of claim 5 wherein the handle comprises a rod, a ring or a hook.

* * * * *